United States Patent
Srinivasan et al.

(10) Patent No.: US 12,074,799 B2
(45) Date of Patent: Aug. 27, 2024

(54) IMPROVING END-TO-END CONGESTION REACTION USING ADAPTIVE ROUTING AND CONGESTION-HINT BASED THROTTLING FOR IP-ROUTED DATACENTER NETWORKS

(71) Applicant: Intel Corporation, Santa Clara, CA (US)

(72) Inventors: Arvind Srinivasan, San Jose, CA (US); Malek Musleh, Portland, OR (US); Allister Alemania, North Plains, OR (US); Roberto Penaranda Cebrian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1008 days.

(21) Appl. No.: 16/809,013

(22) Filed: Mar. 4, 2020

(65) Prior Publication Data
US 2020/0236052 A1 Jul. 23, 2020

(51) Int. Cl.
*H04L 47/11* (2022.01)
*H04L 43/106* (2022.01)
(Continued)

(52) U.S. Cl.
CPC .......... *H04L 47/115* (2013.01); *H04L 43/106* (2013.01); *H04L 45/22* (2013.01);
(Continued)

(58) Field of Classification Search
CPC ..... H04L 47/115; H04L 43/106; H04L 45/22; H04L 45/28; H04L 45/60; H04L 47/122;
(Continued)

(56) References Cited

U.S. PATENT DOCUMENTS

| 10,171,355 B2 * | 1/2019 | Wang | H04L 45/64 |
| 10,833,998 B2 * | 11/2020 | Shmilovici | H04L 45/74 |

(Continued)

FOREIGN PATENT DOCUMENTS

| CN | 103729332 A | * | 4/2014 | |
| CN | 112242956 A | * | 1/2020 | H04L 45/74 |
| CN | 112242956 A | * | 1/2021 | H04L 47/10 |

OTHER PUBLICATIONS

International Search Report and Written Opinion for PCT Patent Application No. PCT/US20/61011, Mailed Mar. 5, 2021, 13 pages.
(Continued)

*Primary Examiner* — Ayaz R Sheikh
*Assistant Examiner* — Louis Samara
(74) *Attorney, Agent, or Firm* — Compass IP Law PC

(57) ABSTRACT

Methods for improving end-to-end congestion reaction using adaptive routing and congestion-hint based throttling for IP-routed datacenter networks and associated apparatus. In connection with forwarding packets between sending and receiving endpoints coupled to one or more networks, one or more network switches are configured to detect current or approaching congestion conditions, generate congestion notification packets (CNPs), and return the CNPs to sending endpoints. The CNPs may be routed using one or more adaptive routing mechanisms to forward the CNPs along non-congested paths or may be forwarded along a fastest path to a sender. The CNPs further may comprise meta-data including a flow identifier associated with a packet sent from an endpoint, a congestion level for the flow, and a timestamp. CNPs may comprise unreliable datagrams that may be received out-of-order, with the timestamps being used to determine whether CNPs should be disregarded at a switch along the forwarding path to the sending endpoint or at the sending endpoint. Endpoint network interfaces implement a (Continued)

congestion-CNP table storing entries associating congested flows with congestion levels.

18 Claims, 10 Drawing Sheets

(51) Int. Cl.
  *H04L 45/00* (2022.01)
  *H04L 45/28* (2022.01)
  *H04L 45/60* (2022.01)
  *H04L 47/122* (2022.01)
  *H04L 47/32* (2022.01)
  *H04L 49/00* (2022.01)

(52) U.S. Cl.
  CPC .............. *H04L 45/28* (2013.01); *H04L 45/60* (2013.01); *H04L 47/122* (2013.01); *H04L 47/323* (2013.01); *H04L 49/70* (2013.01)

(58) Field of Classification Search
  CPC ..... H04L 47/323; H04L 49/70; H04L 47/263; H04L 47/193; H04L 45/64; H04L 45/74; G06F 15/17381
  See application file for complete search history.

(56) References Cited

U.S. PATENT DOCUMENTS

| | | | | |
|---|---|---|---|---|
| 2014/0301390 | A1* | 10/2014 | Scott | G06F 15/17362 370/389 |
| 2014/0376557 | A1* | 12/2014 | Park | G06F 15/17381 370/400 |
| 2018/0006946 | A1* | 1/2018 | Flajslik | H04L 47/12 |
| 2018/0198715 | A1* | 7/2018 | Shmilovici | H04L 47/2483 |
| 2019/0182161 | A1* | 6/2019 | Ravi | H04L 47/30 |
| 2019/0342199 | A1* | 11/2019 | Hurson | H04L 43/0882 |
| 2019/0386924 | A1* | 12/2019 | Srinivasan | H04L 47/122 |
| 2020/0396170 | A1* | 12/2020 | Gafni | H04L 47/35 |
| 2021/0083981 | A1* | 3/2021 | Shmilovici | H04L 45/74 |

OTHER PUBLICATIONS

Nan Jiang et al., 'Network congestion avoidance through Speculative Reservation', In: IEEE International Symposium on High-Performance Comp Architecture, Mar. 15, 2012, sections 4-8.

Yao H. Ho et al., 'Dynamic Route Diversion in Connectionless Mobile Ad Hoc Networks', In: 2008 International Conference on Networking, Architecture, and Storage, Jul. 25, 2008, sections 3-4.

Gao, Yixiao, et al., "DCQCN+: Taming Large-scale Incast Congestion in RDMA over Ethernet Networks", 2018 IEEE 26th International Conference on Network Protocols, IEEE, Sep. 17, 2018, 11 pages.

Li, Yuliang, et al., "HPCC: High Precision Congestion Control", . In Proceedings of the ACM Special Interest Group on Data Communication (pp. 44-58), Aug. 19-23, 2019, 15 pages.

Mari, Roberto, "In-Band Network Telemetry—A Powerful Analytics Framework for your Data Center", OCP Smummit, Copyrigh 2018—Barefoot Networks, Mar. 27, 2018, 19 pages.

* cited by examiner

IMPROVING END-TO-END CONGESTION REACTION USING ADAPTIVE ROUTING AND CONGESTION-HINT BASED THROTTLING FOR IP-ROUTED DATACENTER NETWORKS

Datacenter network traffic continues to increase exponentially with data-intensive usage models involving HPC (high-performance computing) and AI (artificial intelligence) is becoming more pervasive in the cloud. These applications simultaneously demand high throughput and low latency, while Cloud Service Providers (CSPs) require network stability. Unregulated traffic flow leads to congestion build-up in the network resulting in packet drops, low effective throughput, and longer message completion times.

A congestion control mechanism that may be deployed in IP-based routed datacenter to address these requirements is DataCenter-QCN (DCQCN) employed as part of RoCEV2 (RDMA over converged Ethernet, version 2). Due to its lossless network requirement, RoCEV2 also requires PFC (Priority Flow Control) to be enabled. As part of the DCQCN algorithm, Congestion Notification Packets (CNPs) are sent from the receiver back to the sender when the receiver receives packets marked with ECN bits. Modern network switches employ Explicit Congestion Notification (ECN) marking to packets when switch occupancy exceeds a given threshold (a statically configurable parameter). When a receiver successfully receives a packet marked with ECN, thus indicating the presence of congestion along the flow's network path, it generates a CNP to be sent back to the sender. CNPs are generated whenever an ECN-marked packet is received but generation frequency is capped at a configurable maximum rate.

Using CNPs as an indicator of congestion, the sender makes adjustments to its transmission rate. Naturally, the ability for the sender to react to congestion is wholly dependent on successfully receiving these CNPs. In addition, there are several other key problems that can arise which prohibit successful congestion reaction.
1) The maximum rate at which CNPs can be generated by a receiver is statically configured. A statically configured maximum rate is unsuitable for dynamic traffic patterns/workloads that would optimally require either more frequent/dynamic feedback to the sender to react accordingly.
2) CNPs are also affected by congestion in the return path (path from receiver to sender) therefore incurring arrival delays at the sender. The delayed arrival of CNPs cause the sender to react to congestion later than otherwise would be optimal.
3) CNPs are unreliable datagrams meaning that the receiver does not maintain state for retransmission.
4) Sender-side congestion reaction can still encounter issues despite successfully receiving CNPs in a timely manner—the receiving NIC can potentially be overwhelmed with CNPs which, depending on NIC architecture results in a slowdown in data-processing as the NIC must split its time to perform CNP processing, packet-building for transmissions, handling incoming data packets from network, etc.
5) Forward path/receiver congestion: part of the CNP round-trip-time is comprised of the time required by an ECN-marked packet to traverse along the forward path from the switch that marked the ECN to the receiver, and successful processing of the packet at the receiver. Congestion along the forward path as well as processing delays at the receiver NIC can substantially delay the RTT of a CNP being sent back to senders.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
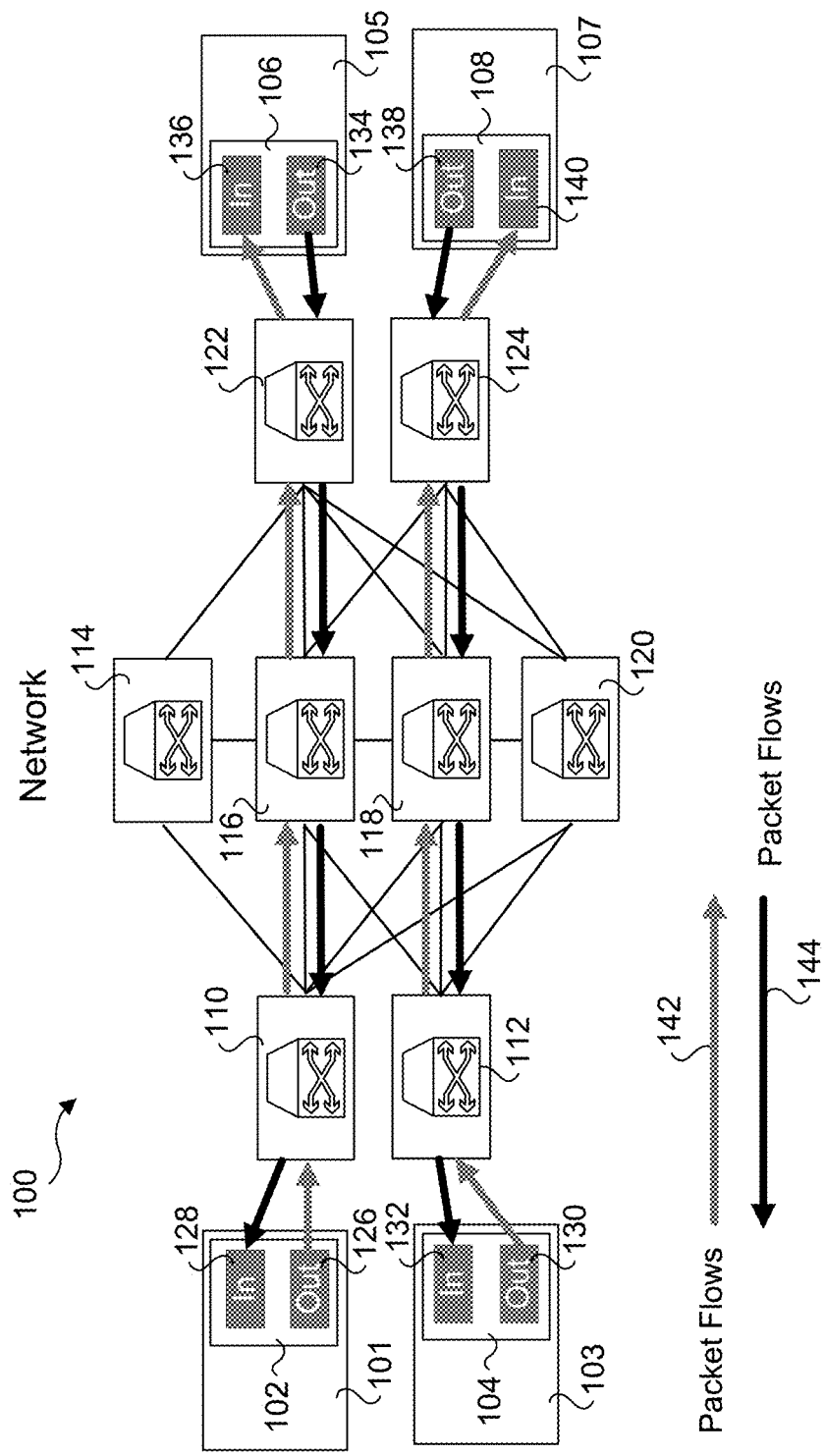
FIG. 1 is a schematic diagram of a network including a plurality of interconnected switches that are configured to forward packets between a plurality of endpoints.

Embodiments of methods for improving end-to-end congestion reaction using adaptive routing and congestion-hint based throttling for IP-routed datacenter networks and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed and illustrated herein, solutions are provided that address the problems with DCQCN and RoCEV2 implementations. The solutions include generation of CNPs at switches, adaptive routing of CNPs, switch-generated hints, and/or use of CNP meta-data including information associated with packet flows, congestion levels, and timestamps. The meta-data is used by network interfaces at sending endpoints to implement a congestion-CNP table including flow entries with associated congestion levels. In some embodiments the CNPs comprise unreliable datagrams that may be received out-of-order and the CNP meta-data include timestamps used to determine when CNPs are stale and may be discarded.

Adaptive Routing is used to adaptively re-route CNPs to avoid congestion. Since today's Ethernet NICs/endpoints architecture constraints are unable to tolerate significant numbers of out-of-order received packets (e.g., default Linux Kernel setting is set to 3), adaptive/multipath routing schemes that might normally improve network throughput/load-balancing/packet-latency are not typically deployed in production settings. However, there are two characteristics of CNPs that can be leveraged to support adaptive routing. First, CNPs are unreliable datagrams, meaning that senders of CNPs do not need to maintain state for retransmission. Second, the order of CNP arrivals does not matter to the receiving NIC because it does not impact program correctness, which eliminates the need to maintain any ordering state. As a result of these two characteristics, CNPs can be adaptively re-routed on a hop-by-hop basis along paths in networks with reduced traffic to avoid congestion without the same concerns applicable to (re-routing) data payloads.

Switch-generated hints enables network switches to substantially reduce overall network traffic bandwidth consumed by CNPs. Instead of waiting for ECN-marked data payloads to traverse to the receiver endpoint, and subsequently waiting for the receiver to process the marked payload and then turn around and transmit a CNP to the flows' originating endpoints, switches can directly generate the CNPs to mitigate 1) delays present in the forward path of the network and 2) delays in receiver NIC processing incoming packet/generating a CNP. This approach substantially reduces network bandwidth consumed by CNPs.

In some embodiments the CNPs themselves contain additional information (meta-data) comprising congestion data that indicates relative degrees of congestion (quantized down to N-bits, e.g. where N=8), and timestamp telemetry indicating when it was created. Enabling CNPs to indicate different granularities of congestion (instead of ON/OFF) allows the congested point (Switch/Receiver) to directly indicate to the sender the intensity of congestion, mitigating the need for the Sender to "reverse engineer" through complicated heuristics how much congestion is occurring, or when to react. The timestamp telemetry also solves the problem of deciphering stale congestion information from late arriving CNPs.

In some embodiments, these degree-of-congestion bits may also be employed to implement various QoS schemes. For example, enabling the receiver to mark different degrees of congestion with the expectation that the sender will throttle back injection at a rate relative to the number of bits marked, the receiver need not always apply uniformity.

Adaptive Routing

Adaptive routing of the CNPs helps them reach the senders' endpoints more quickly and efficiently in the presence of network congestion. Timely arrivals of CNPs are important for the senders' NICs to react effectively to detected congestion in the network. The following exemplary, non-limiting approaches may be used.

Under a first embodiment, a routing scheme such as RPS (Random Packet Spray) is used. Instead of sending the CNP along the same deterministic path (output port) as other payloads destined for the same endpoint, the switch randomly picks one of the allowable (possible) forwarding paths to send the CNP along. In this manner, there is a reduced probability that over time the randomly picked path would encounter significant congestion as compared to the deterministic path.

Under a second embodiment, a more intelligence based (congestion-aware) mechanism is used to re-route CNPs under which the CNPs are sent to an output port with the least amount of queued packets (e.g., lowest queue fill level). The occupancy of each port could be maintained via a quantized manner (e.g., a 4-bit quantized value in one embodiment) in order to minimize switch hardware overhead. Furthermore, when there are two or more possible paths, in some embodiments local congestion for all possible output ports doesn't need to be recorded to save additional overhead.

FIG. 1 shows a network 100 including a plurality of endpoints 101, 103, 105, and 107 and a plurality of switches 110, 112, 114, 116, 118, 120, 122, and 124. Each of endpoints 101, 103, 105, and 107 includes respective network interface controllers (NIC) 102, 104, 106, and 108. NIC 102 includes an output port 126 and an input port 128, NIC 104 includes an output port 130 and an input port 132, NIC 106 includes an output port 134 and an input port 136, and NIC 102 includes an output port 138 and an input port 140. Input ports are also referred to as receive (RX) ports, while output ports are also referred to as transmit (TX) ports.

In network 100, switches 110, 112, 122, and 124 are edge switches, while switches 114, 116, 118, and 120 are core switches. Network 100 is illustrative of a Wide-Area Network (WAN) or similar type of network that may generally include 10's, 100's or 1000's of switches. Additionally, each edge switch in a WAN will generally be connected to one or more endpoints. Moreover, an edge switch may be used to connect a WAN to another network, such as a Local Area Network (LAN). For ease of understanding, the endpoints illustrated herein are shown connected to edge switches, whereas in some network environments, endpoints would be implemented in a LAN that is coupled to a WAN. For example, in some data center environments, edge switches are Top-of-Rack (ToR) switches that connect one or more LANs in a given rack to a WAN in the data center. In some data center environments, the endpoints may comprise compute nodes in a disaggregated architecture such as Intel® Corporation's Rack Scale Design under which a hierarchy of switches may be implemented underneath a ToR switch.

Communication between endpoints 101 and 105 and between endpoints 103 and 107 are depicted by packet flows 142 and 144. In an actual data center implementation, there would be similar packet flows supporting communication between a multitude of endpoints; however, such additional flows and endpoints are now shown in the Figures herein for clarity and simplicity.

Figure 1A:
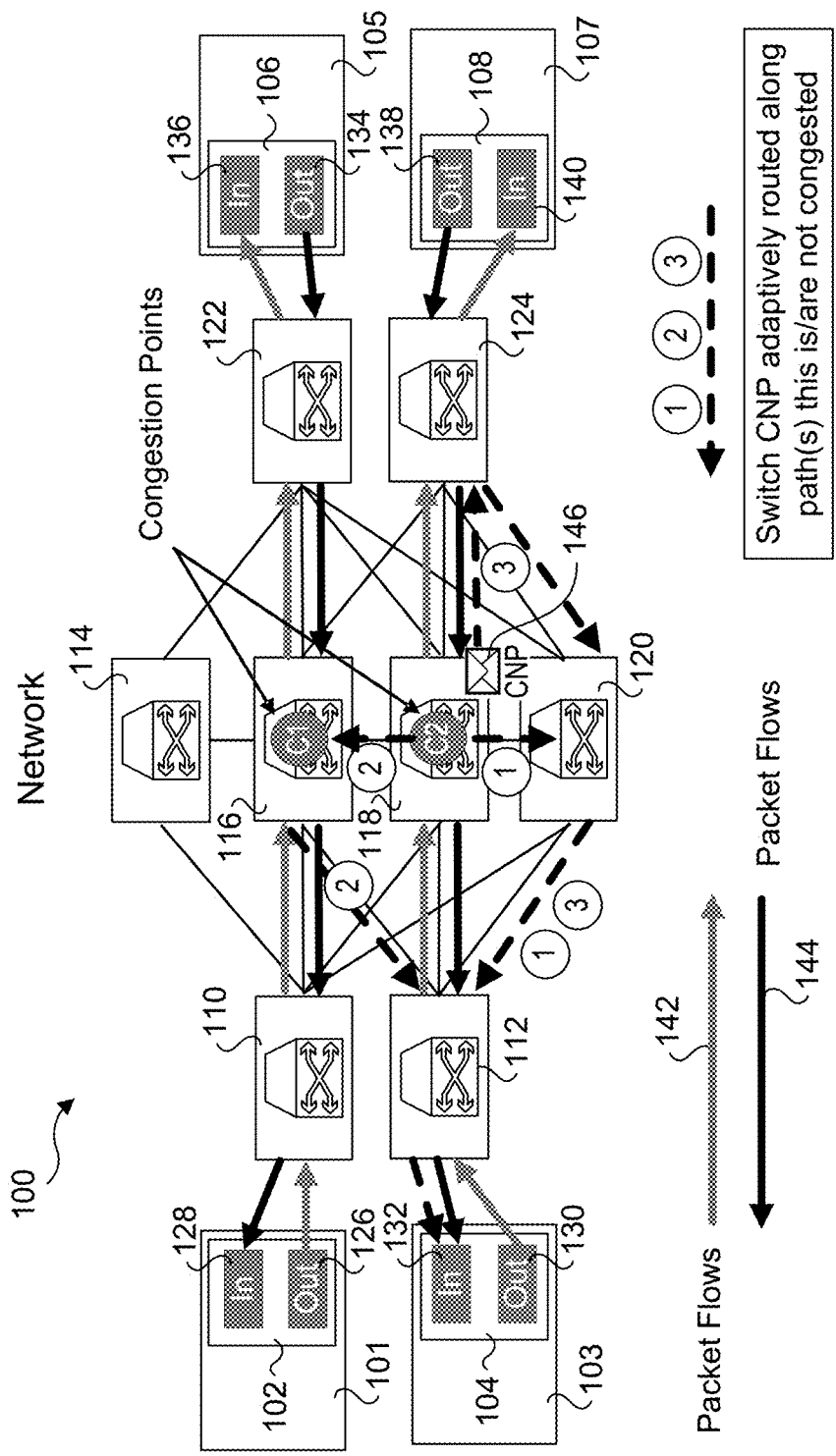
FIG. 1a is schematic diagram of the network of FIG. 1 further illustrating examples of adaptive routing of CNPs along non-congested paths, according to one embodiment.

Examples of CNP adaptive routing are shown in FIG. 1*a*. As illustrated, network 100 has congestion points C1 and C2 in switches 116 and 118. Generally, congestion may occur at a given input port or output port of a switch (or both). Congestion also may occur along one or more paths passing through a switch, while other paths passing through a switch may not be congested. In the case of congestion points C1 and C2, congestion is along the paths employed by packet flows 142 and 144 (e.g., for at least one of the inputs ports along a given path and/or the output ports along the patch).

Figure 8:
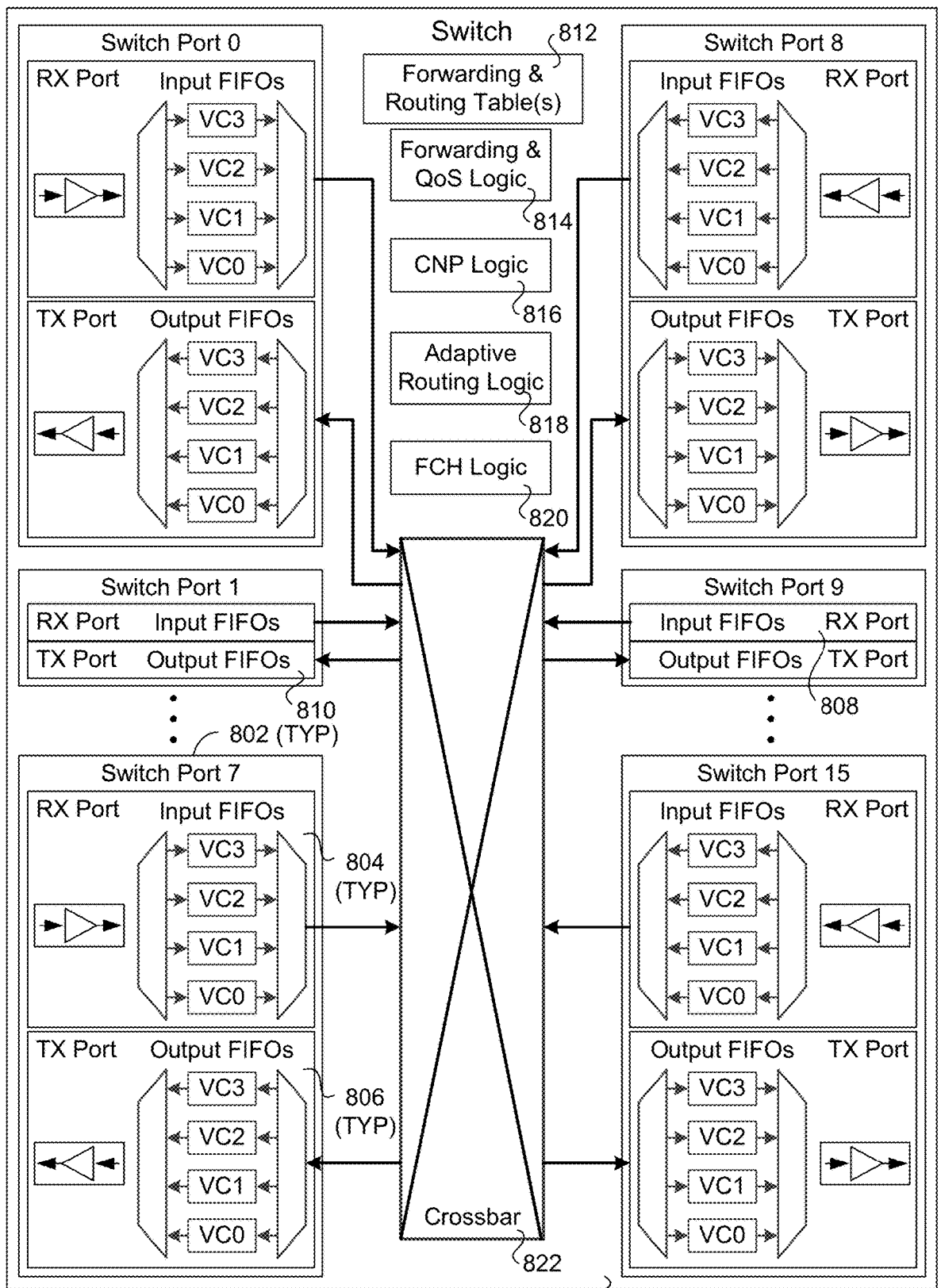
FIG. 8 is a schematic diagram illustrating an architecture for a switch that may be used for implementing aspects of the network switches disclosed herein, according to one embodiment.

Generally, the switches herein may be configured to determine current or future (projected) congestion conditions and/or degrees or levels of congestion using known methods. For example, in some embodiments, congestion degrees/levels may be detected by monitoring fill levels of RX and/or TX queues in a switch. Packets are forwarded through internal paths in switches coupled between an RX (input) port and a TX (output) port. Such internal paths generally may include an RX queue of buffer coupled to or integrated in the RX port and a TX queue or buffer coupled to or integrated in the TX port. As described and illustrated in switch architecture of FIG. 8 below, RX and TX queues/buffers may comprise FIFO (First-in, First Out) queues (also referred to as FIFOs). A forwarding path through a switch may also include one or more additional levels of buffer/queuing to supported QoS or other functionality. Optionally, QoS functionality may be implemented in FIFOs, such as shown in FIG. 8.

An example of adaptive routing using Random Packet Spray is shown in FIG. 1*a*. Generally, each network switch may include one or more routing tables that contain information that maps switch output (TX) ports to destination addresses (or more generally, when Internet Protocol (IP) is used, octets or combinations of octets in the destination addresses). In some cases, the routing table information may be limited to shortest path first (SPF) information, under which packets are routed via the shorted path (in terms of network hops) to a destination endpoint or edge switch via which the destination endpoint may be reached. Some switches may employ statistical route information that tracks path latencies to enable a switch to route a packet along a nominally longer route (more hops) that has lower latency than the SPF route under some conditions.

Figure 2A:
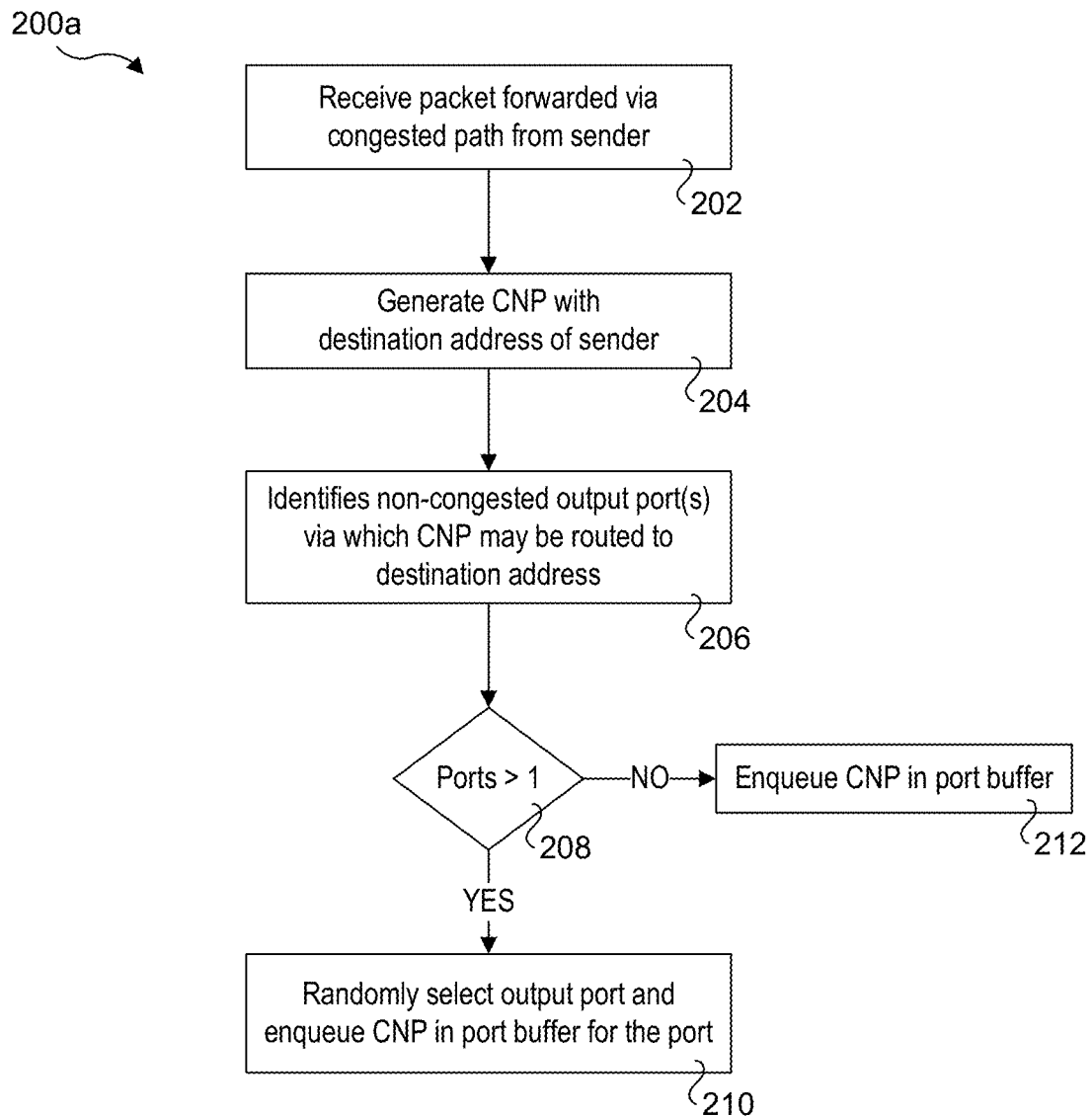
FIG. 2a is a flowchart illustrating logic and operations for implementing a first adaptive routing mechanism under which an output port for forwarding a CNP along a non-congested path is randomly selected among multiple output ports.

Under RPS, a switch is aware of (has information indicating) which ports are congested and may randomly chose other ports for routing CNP packets back to senders. With reference to flowchart 200*a* of FIG. 2*a*, in one embodiment the following operations and logic are implemented. In a block 202, a packet originating from a sender that has been forwarded via a congested path is received at the switch. In a block 204 the switch generates a CNP with a destination address of the sender (e.g., the destination address of the endpoint that sent the packet, which will be the source address in the packet received at the switch). In a block 206 the switch identifies one or more non-congested output ports via which the CNP may be routed to the destination address. As discussed above, the switch may employ one or more routing tables to identify ports that may be used to reach the destination address.

In a decision block 208 a determination is made to whether more than one non-congested output port is identified. If YES, the logic proceeds to a block 210 in which an output port from among the identified output ports is randomly selected and the CNP is enqueued in an output buffer for that port. If there is only one output port that is identified in block 206, the answer to decision block 208 is NO and the logic proceeds to enqueue the CNP in the output buffer for that port, as depicted in a block 212.

Returning to FIG. 1*a*, in response to receiving a packet originating from endpoint 103 along a congested path leading to congestion point C2, switch 118 generates a CNP 146. In this example, there are three adaptive routes that are illustrated, labeled by encircle numbers '1', '2', and '3'. As discussed above in flowchart 200*a*, in a block 206 non-congested output ports would be identified and, in the event, multiple ports are identified, under RPS one or the output ports would be selected and the CNP would be enqueued in the output port buffer for that port. In the case of adaptive route '1', CNP 146 would be enqueued in the output port on switch 118 coupled to the link between switch 118 and switch 120. Similarly, for adaptive route 2, CNP 146 would be enqueued in the output port on switch 118 coupled to the link between switch 118 and switch 116, while for adaptive route 3, CNP 146 would be enqueued in the output port on switch 118 coupled to the link between switch 118 and switch 124.

The complete path for adaptive route '1' is switch 118→switch 120→switch 112→endpoint 103. The complete path for adaptive route '2' is switch 118→switch 116→switch 112→endpoint 103, while the complete path for adaptive route '3' is switch 118→switch 124→switch 120→switch 112→endpoint 103.

In the embodiment illustrated in FIG. 1*a*, switches 112, 116, 120, and 124 are depicted as implementing forwarding operations, where CNP 146 would be received at a switch, its header including the destination address of endpoint 103 would be inspected, the switch would perform a lookup in one or more routing table to determine the appropriate output port to use for the next hop in the route, and CNP 146 would be enqueued in the buffer for that output port and subsequently sent via the link coupled to that output port to an input port on the next switch (along the route) at the other end of the link. Although switch 116 is depicted with congestion point C1, in this example the congestion is only along the horizontal paths through switch 116, and thus the path from switch 118→switch 116→switch 112 is not congested. In the example of adaptive route '3' backward routing is used. In some instances, provisions may need to be implemented to prevent cycling when backward routing is used. For example, switch 124 may be configured such that it does not return a received CNP along the same link the CNP is received, even if that route was an SPF route or might be a route with the least latency to the destination endpoint for the CNP.

As can be understood above, CNPs are not necessarily associated with an order and may be transmitted as unreliable datagrams using an unreliable transport protocol (such as UDP). Thus, while out-of-order delivery of CNPs using RPS may occur, the receiving endpoint has no concept the CNPs are out of order (without inspecting a timestamp, as discussed above), since there is nominally no ordering associated with CNPs. Thus, an advantage of SPF is it may increase the likelihood that a CNP is received (without needing to be aware of congestion that may be present in the downstream portion of the adaptive route). SPF may also be used to more evenly distribute the bandwidth consumed by CNPs.

Figure 2B:
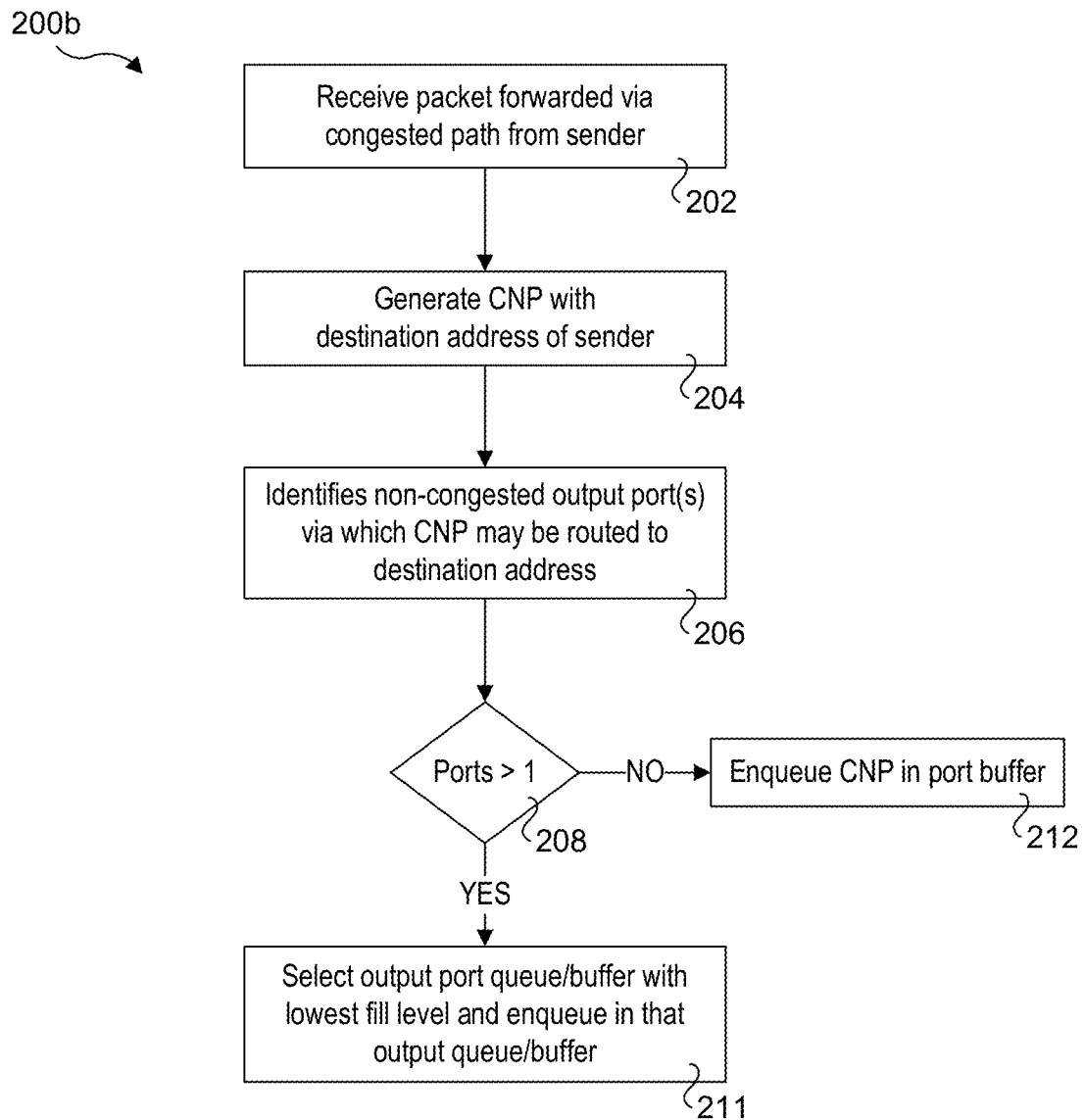
FIG. 2b is a flowchart illustrating logic and operations for implementing a second adaptive routing mechanism under which an output port for forwarding a CNP along a non-congested path is selected from among multiple output ports based on an amount of queued packets.

Flowchart 200b of FIG. 2b illustrates operations and logic for implementing an embodiment of a congestion-aware adaptive routing mechanism used to re-route CNPs. As depicted by like numbered blocks, the operations in blocks 202, 204, 206, 212, and decision block 208 are the same in flowcharts 200a and 200b. The difference occurs in a block 211 in flowchart 211, where an output port queue or buffer with the lowest fill level among the queues/buffers for the output ports identified in block 206 is selected and the CNP is enqueued in that queue or buffer.

Switch Fastpath Congestion Hints (FCH)

Under current data center operations under DCTCP and DCQCN, when congestion is encountered, packets are marked in the appropriate field and propagated to the destination as usual. The destination echoes the congestion information back to the source by marking returning acknowledgements. The source takes appropriate action—typically invoking a rate throttling algorithm to slow down the flow corresponding to the marked packet. In DCTCP, the ECN field of the packet (Explicit Congestion Notification) is marked on the forward path from sender to receiver in the presence of congestion. In turn, the receiver when sending a response acknowledgement for the arrived packet also have the ECN field marked, thus indicating to the sender the presence of congestion. In DCQCN, the notification of congestion presence in the network is indicated through the CNP, which operates at a different (statically configured) granularity time period, independent of when the receiver sends ACK packets to the sender. The CNP may be sent from the destination or the switch depending on implementation.

In Fastpath congestion hints (FCHs), CNPs are generated at switches and returned to the sender using the fastest forwarding path. For purposes of generality, the FCH generated by the switch can be configured to be in ECN form (in order to be compatible with DCTCP) or CNP form (to be compatible with DCQCN) since fundamentally its purpose of notifying the sender the presence of congestion is the same in both.

In one embodiment an FCH has the following properties:
1. An explicit FCH packet sent from the switch directly to the source (via an applicable forwarding path).
2. An FCH packet is triggered when implementation-specific congestion thresholds are met. An implementation may modulate the rate of FCH generation. Not every packet in a newly identified congested flow requires a corresponding FCH.
3. FCH packets are configurable (statically or by flow differentiation) as high priority to minimize latency to the switch.
4. FCH packets are configurable (statically or by flow differentiation) as unreliable i.e. loss due to congestion is allowed.

FCH Generation in a Switch

In one embodiment, when a switch detects a congestion condition or an approaching congestion condition, besides marking the congestion notification field of a packet the switch formats a message back to the source NIC (e.g., the NIC on the sending endpoint) containing a congestion hint. This results in a smaller latency loop from a transmitter standpoint as the message is being received from an intermediate switch node rather than a far-off receiver. As part of the message, the switches send additional hints along with the packet that can aid the transmitting node to take fine grain actions.

While creating the FCH packet, the header fields are taken from the incoming (received) packet. In one embodiment, the source and destination addresses will be swapped in the header. Inclusion of the original destination address for the source address in the FCH packet enables the sending endpoint to determine which of its packet flows the FCH packet is associated with. In one embodiment, a 1-bit field can be used to denote whether the hint originated from the NIC or a switch.

The payload of the FCH packet contains hints associated with congestion markings and telemetry information. When routing CNPs back to the transmitter, switches may drop CNPs marked with an older timestamp than one that was recently transmitted (see CNP meta-data section below). This will further reduce potential endpoint processing of CNPs by the NIC and is allowable since CNPs are unreliable.

Figure 3:
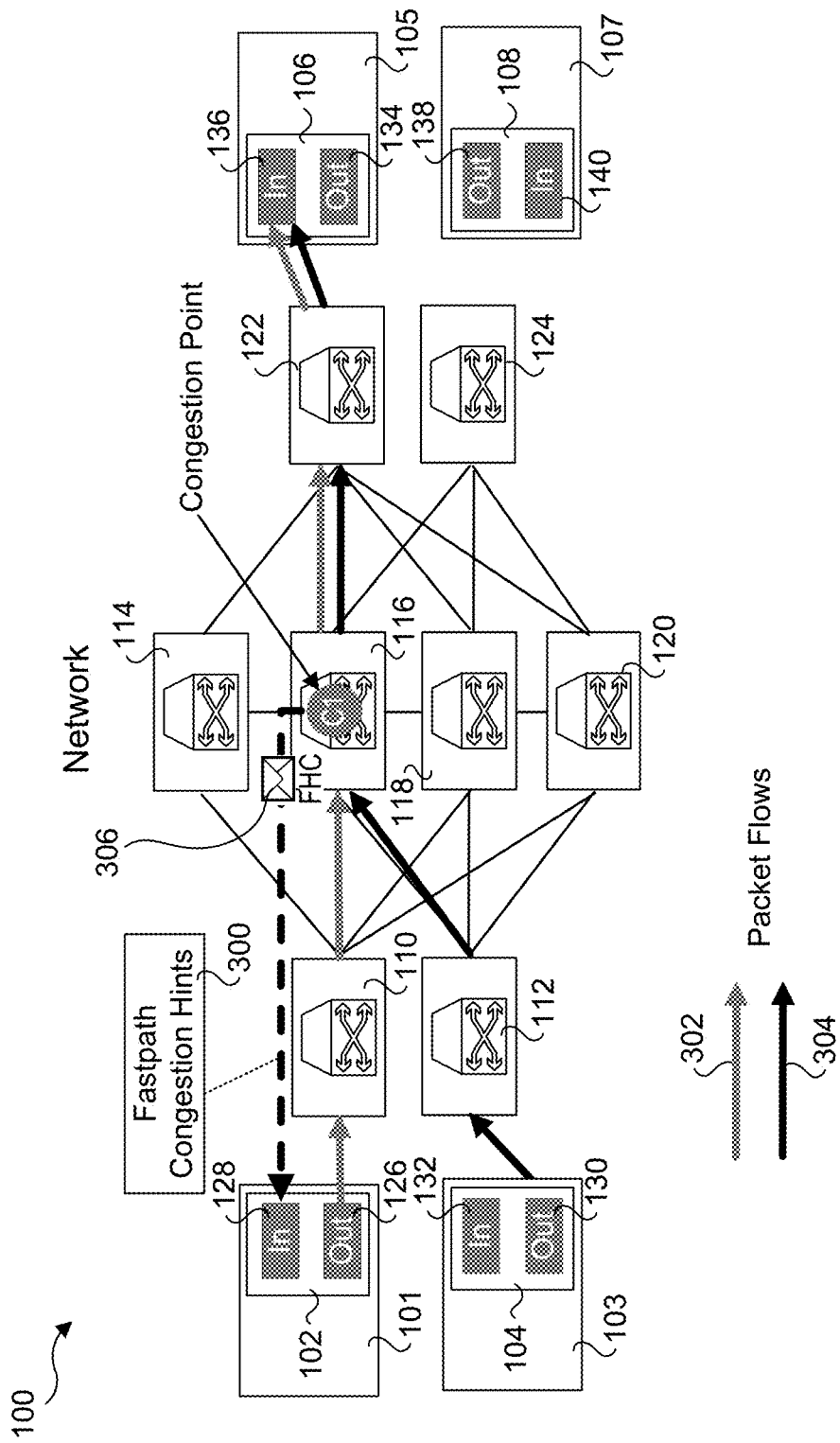
FIG. 3 is a schematic diagram of the network of FIG. 1 further illustrating an example of CNPs comprising fastpath congestion hint (FCH) packets.

FIG. 3 illustrates an implementation of fastpath congestion hints 300 in network 100, according to one embodiment. As shown, endpoint 101 is sending messages (as a packet flow 302) to endpoint 105. In parallel, endpoint 103 is also sending messages (as packet flow 304) to endpoint 105. As further shown, this results in a congestion point in switch 116 corresponding to the output port of switch 116 coupled between port 116 and switch 122.

In response to detection of a congestion condition or an approaching congestion condition in connection with receipt of a packet sent from endpoint 101, switch 116 generates an FHC packet 306 and sends it back to endpoint 101, where it is received at input port 128 on NIC 102. As discussed above, switch 116 swaps the source and destination address of the packet received from endpoint 101 to obtain the source and destination addresses in the FHC packet header. As further shown, FHC packet 306 is routed along the fastest path between switch 116 and endpoint 101 (hence the name fastpath congestion hint).

CNP Meta-Data

In one embodiment, the CNPs themselves will contain the following additional information (comprising the CNP meta-data):
1) Congestion Degree/Level: In one embodiment, the degree or level of congestion will be quantized and represented in an 8-bit format as part of the packet field. This provides a method to indicate different degrees of congestion (light→heavy) based on the bit-marking, and enables the sender to throttle back at a rate relative to the degree of congestion indicated (instead of simply ON/OFF, or having to calculate algorithmically based on the # of CNPs received within a time period).
2) Timestamp of Generation: When a CNP is generated by a switch (or, optionally, by the receiver NIC), the switch or receiver NIC will add a timestamp in the CNP header or payload. The timestamp in conjunction with the congestion degree field is used by the sender (upon receiving of CNP) to determine whether the newly arriving CNP is more recent (and hence more accurately reflects congestion state) than an earlier received CNP. Due to adaptive routing, CNPs generated at a later time (as indicated by the timestamp field value) may arrive at the sender earlier relative to a previously generated CNP (e.g., out of order reception of CNPs, as discussed above).

In some embodiments, the CNP meta-data may further include information for implementing QoS (Quality-of-Service). In one aspect, QoS is implemented by enabling the receiver to mark different degrees of congestion with the expectation that the sender will throttle back injection at a rate relative to the number of bits marked, the receiver need not always apply uniformity. For example, in a 4-to-1 incast, the receiver would normally mark the CNPs destined for each of the senders with the same congestion degree, so that they inevitably throttle back to 25% of their injection rate in order to achieve equal fairness. However, a receiver could mark the congestion degree differently so that some senders throttle back less/more relative to the others. Such situations could be used to throttle back lower tiered customers' jobs more so than throttling back higher tiered (higher priority) jobs in a Data Center Network or other environments employing QoS.

CNP Processing in the NIC

Figure 4:
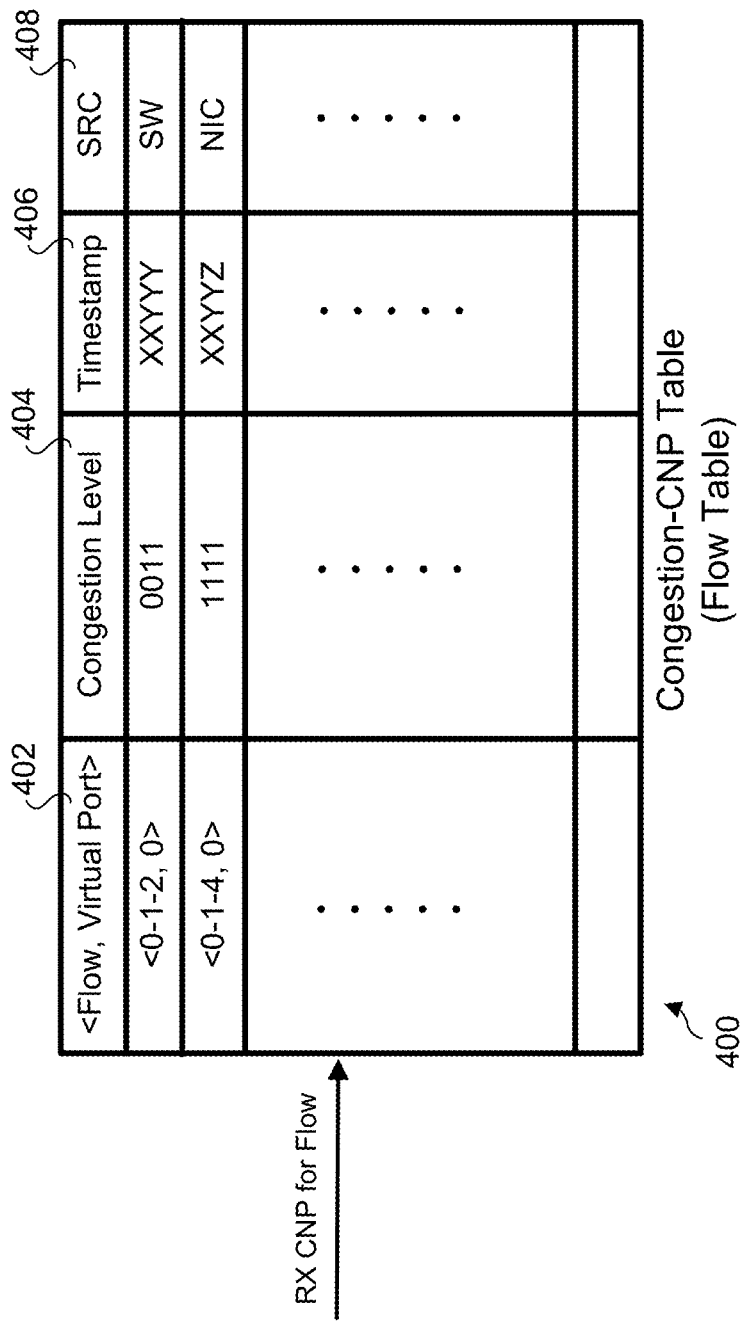
FIG. 4 shows a congestion-CNP table, according to one embodiment.

As discussed above, CNPs are returned to sending endpoints, where they are received at an input port (RX port) on the endpoint's NIC or similar network interface. In one embodiment the NIC implements a Congestion-CNP table 400 shown in FIG. 4. Congestion-CNP table 400 includes a flow and virtual port field 402, a congestion level field 404, a timestamp field 406 and an optional SRC (source) field 408. In some embodiments a flow field is used that doesn't include a virtual port. In some embodiments, the Congestion-CNP table does not include a source field.

Each entry in Congestion-CNP table 400 represents a flow and virtual port (e.g. traffic class). For each received CNP, the congestion level and timestamp for the given flow and virtual port is recorded in congestion level column 404 and timestamp column 406. The source of the CNP (e.g., a switch (SW) or NIC) is recorded in SRC column 408. If a later arriving CNP is recorded with a more recent timestamp, the entry for the flow in the table is updated (reflecting more accurate congestion state), otherwise the CNP is discarded. Allowing stale CNPs to be discarded mitigates the NICs' processing overhead & delays with having to process an overwhelming number of received CNPs.

Figure 4A:
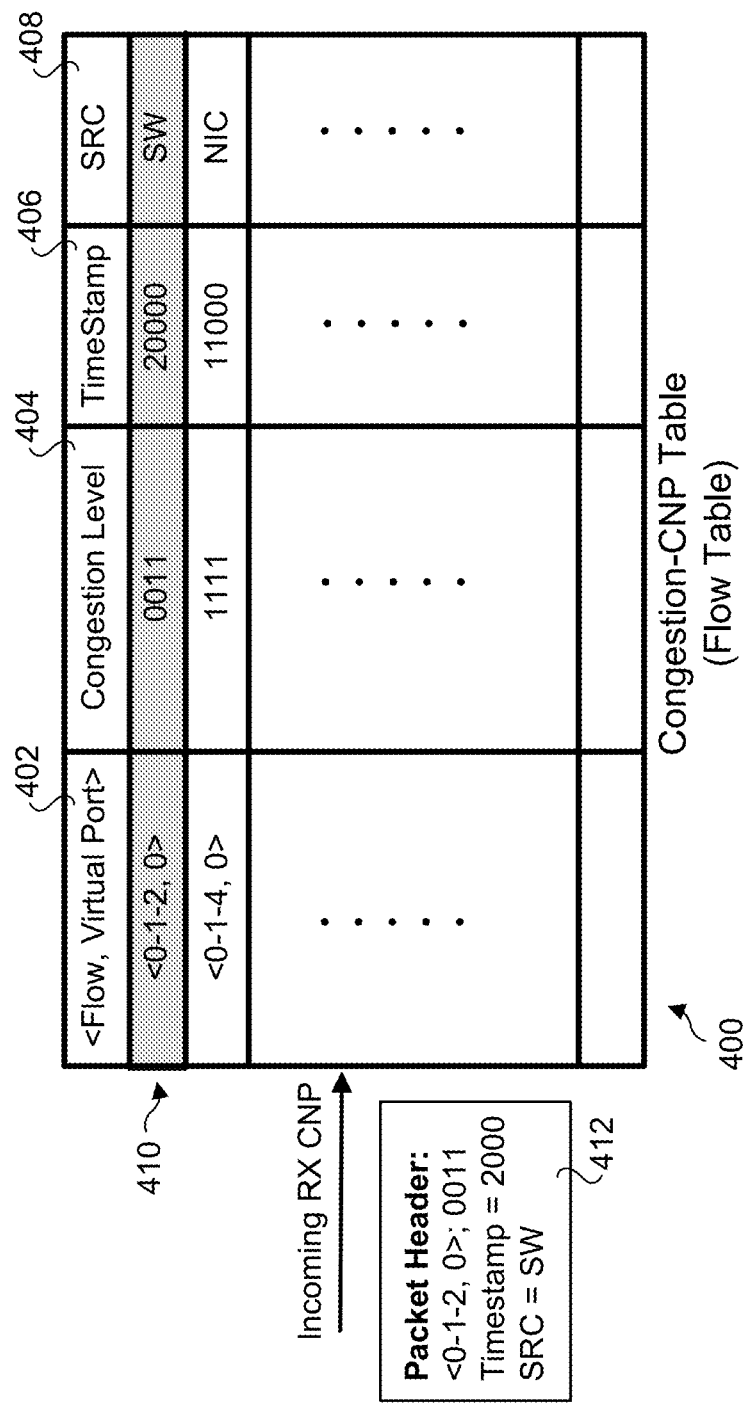
FIG. 4a shows an entry in the congestion-CNP table being updated with a current congestion level value and an associated timestamp.

FIG. 4a shows an entry 410 that has been updated in Congestion-CNP table 400 in response to receiving a CNP 412. In the illustrated embodiment, the congestion level is specified by 4-bits in the header (hence max value of 15). In this illustration, Flow <0-1-2>@ virtual port 0 is marked with a congestion level of value 3 (0011 hex), which is lower than the congestion degree of flow <0-1-4>@ virtual port 0 (value=15). Therefore, the Transmitter could more aggressively throttle back Flow <0-1-4> as compared to Flow <0-1-2>.

Figure 5:
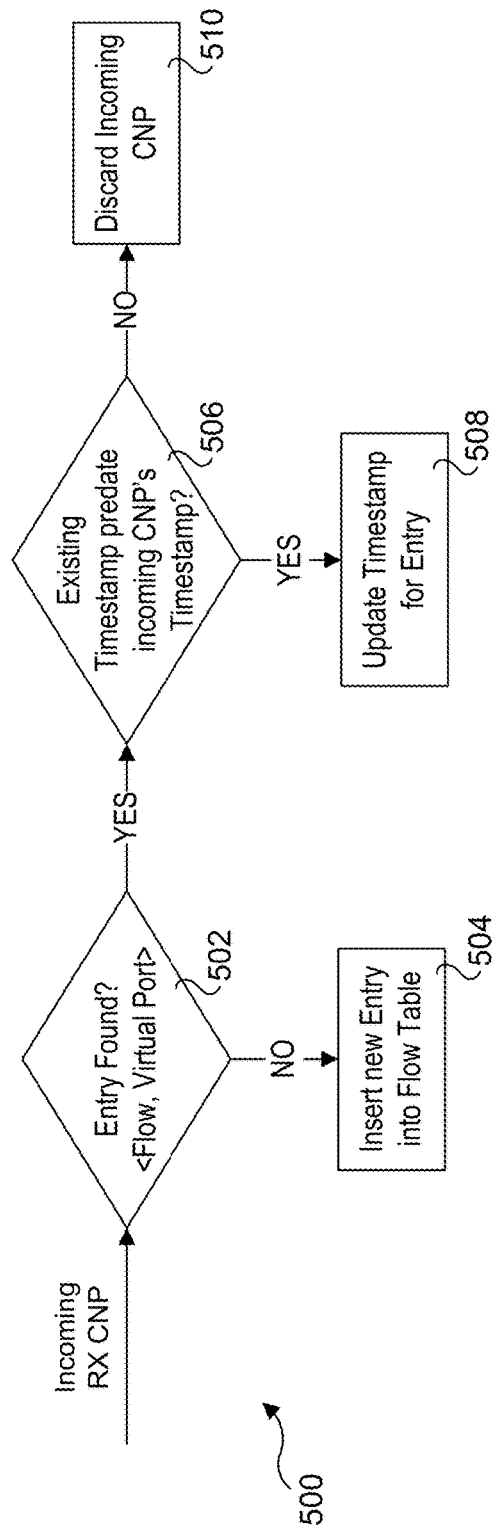
FIG. 5 is a flow diagram illustrating operations and logic for processing an incoming RX CNP, according to one embodiment.

A flowchart 500 illustrating processing logic for an incoming CNP implemented on a NIC is shown in FIG. 5. In a decision block 502 a determination is made to whether an entry for the flow is found. If not, the answer is NO and the logic proceeds to a block 504 in which a new entry is inserted into the flow table. If an entry for the flow is found, the answer to decision block 502 is YES and the logic proceeds to a decision block 506 in which a determination is made to whether the existing timestamp predates the incoming CNP's timestamp. If the answer is YES, the logic proceeds to a block 508 in which the timestamp for the entry is updated. If the answer is NO, the incoming CNP is discarded without changing the existing timestamp for the flow entry, as shown in a block 510.

Constructing this Congestion-CNP table in the NIC provides greater flexibility in capacity than compared to allocating storage on a switch for a similar table. Although the details of how many entries and type of replacement policy to employ is outside the scope of this document, one can assume the following guidelines, in one embodiment:

1. Replacement Policy: Pseudo Least Recently Used (P-LRU) policy when choosing an entry to evict. Smarter (yet potentially more complex) policies such as age-based replacement could be utilized. Age-based replacement may likely be more amenable to mice-flows (short, bursty flows) that don't have re-occurring packets to transmit.
2. Capacity: At least one entry per virtual port (e.g. Traffic Class). Given that traditional NICs generally maintain state for few hundreds of Flows, it may not be unreasonable to assume a similar expectation for this table. Critical Path/Drop-thru time typically dictates the hardware structures' design constraints in order guarantee certain performance expectations. Given that the intended design of this scheme is for hint utilization (hence best-effort), one is able to relax critical time-lookups in favor of ensuring being able to store a larger number of flows.
3. Backup to Host: As an optional feature, host memory can also be utilized to store hint information that does not fit directly in NIC's memory.

In some embodiments NIC processing includes State Table Reset. CNPs are ceased to be generated once network congestion subsides, in which case the information maintained in the Congestion-CNP Table is no longer relevant. In fact, continued use of the congestion information will result in unnecessary throttling of network traffic, thus leading to network under-utilization. This problem is solved by employing a periodic timer reset by the NIC to periodically flush entries from the Congestion-CNP table. This reset period can be conservatively configured to be 2× Round-trip time (RTT).

NIC processing may further include CNP Prioritization. The Sender NIC may prioritize and/or factor in the congestion information from the CNP dependent on the originating source of the CNP, given that CNPs could be generated by both the receiver NIC (as is done today) or by the Switch (as a Hint proposed above). Congestion information recorded by a CNP generated by a Switch may not fully reflect the degree of congestion being experienced at the receiver endpoint (because the switch is just at an intermediate point). However, depending on the receiver endpoints' frequency of generating CNPs (depending on if CNPs are generated by the host's stack, or NIC), the endpoints' frequency may be more coarse-grained than a switch's frequency. Utilizing both the timestamp of the CNP generation as well as the source of the CNP (Host or Switch) the Sender NIC can determine which CNP's information to leverage. For instance, in one embodiment a scheme may prioritize hints generated from a NIC instead of a Switch given that the NIC would have more 'global' information related to a given flow than a switch that is on just one hop of the entire path. In such instances, the hint from the NIC would replace a NIC hint in the table for the same flow. In a more complicated algorithm, a weighted combination of both a Switch+NIC hint could be used (e.g. 70% weight to congestion information provided by the NIC and 30% weight to congestion information provided by the Switch).

Figure 6:
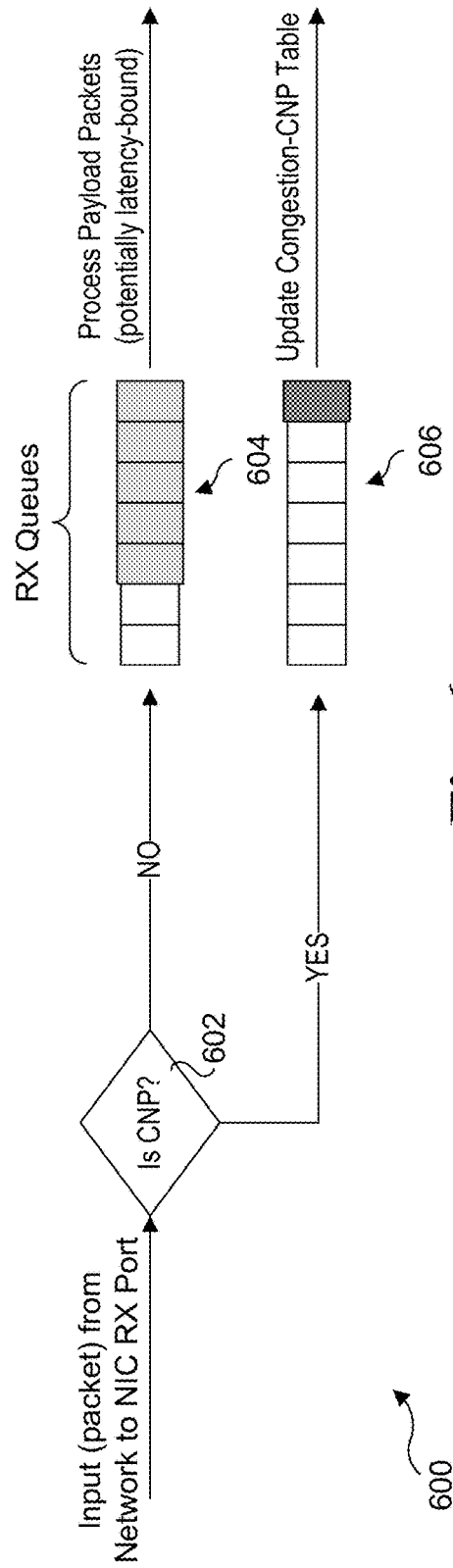
FIG. 6 is a flow diagram illustrating separate packet processing paths employed for RX payload packets and CNPs, according to one embodiment.

FIG. 6 shows a flow diagram 600 for decoupling CNP processing from RX payloads. Packets received from a network are received at a NIC RX port. In a decision block 602 the packet header is inspected to determine whether the packet is a CNP. If not (the situation for most packets), the answer to decision block 602 is NO and the packet is enqueued in an RX queue 604 used for processing non-CNP packets using packet processing operations. If the received packet is a CNP, the answer to decision block 602 is YES, and the packet is enqueued in an CNP RX queue 606. When the CNP gets to the head of the queue it will be processed, including updating the congestion-CNP table (as applicable).

Placing CNPs into a separate receive queue mitigates variable delays in reacting to congestion denoted by the CNPs. In one embodiment, a separate processing engine may be dedicated to servicing CNPs. Alternative implementations may use the same processing engine for both RX payloads & incoming CNPs but apply a prioritization scheme such as Weighted Round-Robin (WRR) or strict priority when selecting between CNPs and RX payloads to process.

Generally, the network devices illustrated as NICs disclosed herein may include but are not limited to network adapters, network controllers or NICs, InfiniBand HCAs, and host fabric interfaces (HFIs). Under some embodiments, the network adaptors, controllers, and NICs are configured to be implemented using one or more Ethernet protocol defined by IEEE 802.3-based protocols. Other types of protocols may also be used, as will be recognized by those having skill in the networking arts.

Figure 7:
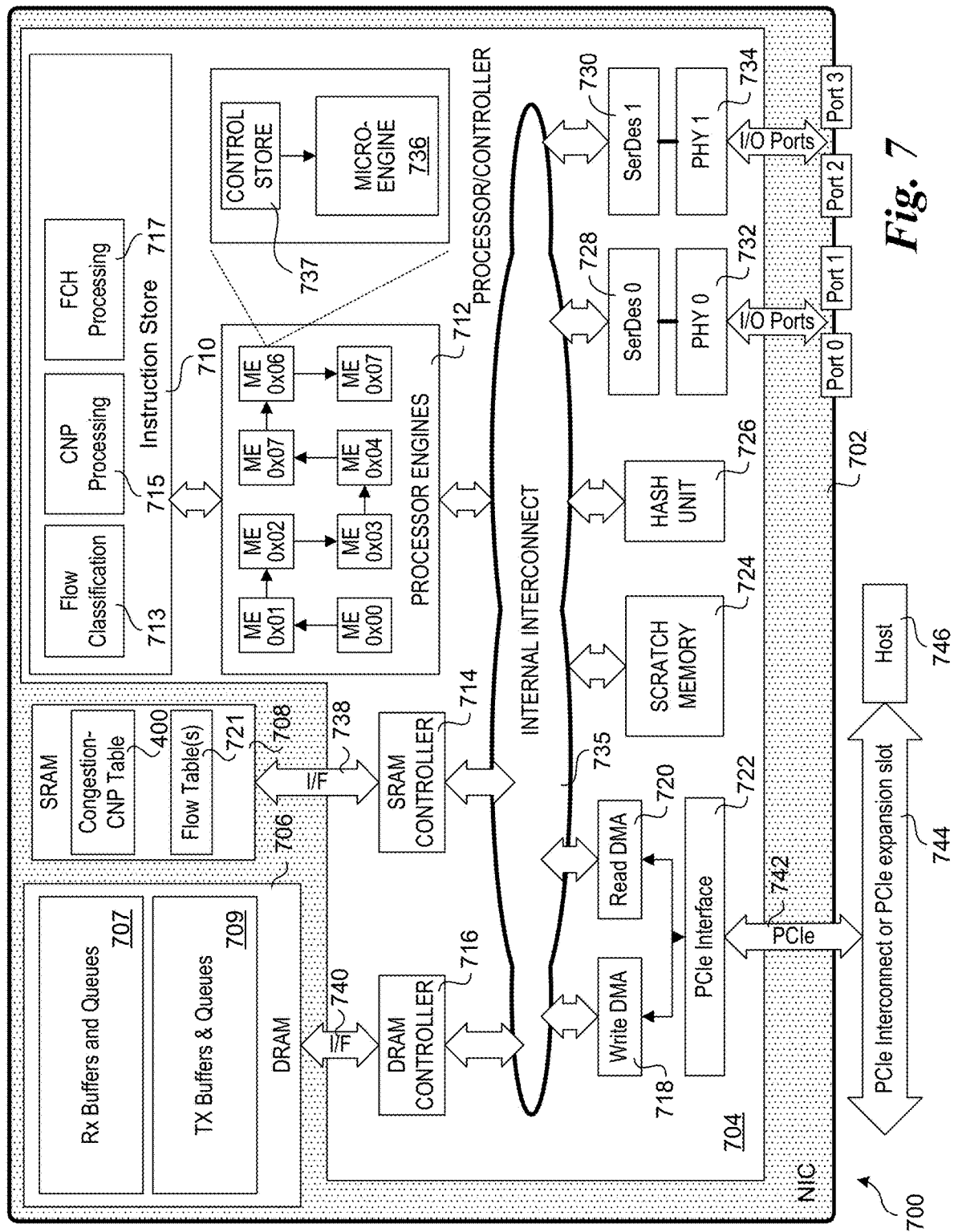
FIG. 7 is a schematic diagram illustrating an architecture for a NIC that may be used for implementing aspects of the network interfaces disclosed herein, according to one embodiment.

An exemplary system architecture for a NIC 700 configured to implement aspects of the embodiments discussed herein is shown in FIG. 7. NIC 700 includes a NIC system board 702 on which a network processor/controller 704, Dynamic Random Access Memory (DRAM) 706 and Static Random Access Memory (SRAM) 708 are mounted. Optionally, SRAM 708 may be implemented using SDRAM (Static DRAM). NIC system board 702 is representative of an Ethernet controller card, a daughter board, a multi-chip module board or substrate, or it may be part of a computer system board, such as a main board or motherboard for a computer server. Processor/controller 704 is representative of Ethernet processing and/or control unit, and may be embodied in various forms, including as an Ethernet controller chip or a network processor unit (NPU).

In the illustrated embodiment, processor/controller 704 includes an instruction store 710, a cluster of processor engines 712, an SRAM controller 714, a DRAM controller 716, a Write DMA block 718, a Read DMA block 720, a PCIe interface 722, a scratch memory 724, a hash unit 726, Serializer/Deserializers (SerDes) 728 and 730, and PHY (Physical Layer) interfaces 732 and 734. Each of the components is interconnected to one or more other components via applicable interconnect structure and logic that is collectively depicted as an internal interconnect cloud 735.

Instruction store 710 includes various instructions that are executed by processor engines cluster 712, including Flow Classification instructions 713, CNP processing instructions 715, and FCH processing instructions 717. Processor engines cluster 712 includes a plurality of microengines 736, each coupled to a local control store 737. Microengines 736 are illustrative of any type of processor element or engine one which instructions are executed, such as but not limited to processor cores, processing engines, etc. Under one embodiment, various operations such as packet identification and flow classification are performed using a pipelined architecture, such as illustrated in FIG. 7, with each microengine performing an associated operation in the pipeline. As an alternative, processor engines cluster 736 is representative of one or more processor cores in a central processing unit or controller. As yet another option, the combination of processor engines 712 and instruction store 710 may be implemented as embedded logic, such as via using an ASIC or Field Programmable Gate Arrays (FPGAs) or the like.

In one embodiment, instruction store 710 is implemented as an on-chip store, such as depicted in FIG. 7. Optionally, a portion or all of the instructions depicted in instruction store 710 may be stored in SRAM 708 and accessed using SRAM controller 714 via an interface 738. SRAM 708 may also be used for storing selected data and/or instructions relating to packet processing operations, such as PC open profile bitmap 202 and PC close profile bitmap 302, as well as caches flow table entries and the like.

DRAM 706 is used to store receive buffers and queues 707 and transmit buffers and queues 709, and is accessed using DRAM controller 716 via an interface 740. Write DMA block 718 and Read DMA block 720 are respectively configured to support DMA Write and Read operations in accordance with the embodiments described herein. In the illustrated embodiment, DMA communication between DRAM 706 and a platform host circuitry is facilitated over PCIe interface 722 via a PCIe link 742 coupled to a PCIe interconnect or PCIe expansion slot 744, enabling DMA Write and Read transfers between DRAM 706 and system memory for a host 746 using the PCIe protocol.

In addition to PCIe, other interconnect technologies and protocols may be used. For example, these include but are not limited to Computer Express Link (CXL), InfiniBand, and Omni-Path.

Scratch memory 724 and hash unit 726 are illustrative of components employed by NICs for facilitating scratch memory and hashing operations relating to packet processing. For example, as described above a hash operation may be implemented for deriving flow IDs and for packet identification.

PHYs 732 and 734 facilitate Physical layer operations for the NIC and operate as a bridge between the digital domain employed by the NIC logic and components and the analog domain employed for transmitting data via electrical, optical or wired signals. For example, in the illustrated embodiment of FIG. 7, each of PHYs 732 and 734 is coupled to a pair of I/O ports configured to send electrical signals over a wire cable such as a Cat6e or Cat6 Ethernet cable. Optical and wireless signal embodiments would employ additional circuitry and interfaces for facilitating connection via optical and wireless signals (not shown). In conjunction with PHY operations, SerDes 728 and 730 are used to serialize output packet streams and deserialize inbound packet streams.

In addition to the instructions shown in instruction store 710, other instructions may be implemented via execution of processor engines 712 or other processing means to facilitate additional operations. For example, in one embodiment, NIC 700 is configured to implement a TCP/IP stack or QUIC on the NIC itself. NIC 700 may also be configured to facilitate TCP operations in a manner that is offloaded from the Operating System TCP facilities, whereby once a packet is sent outbound, NIC 700 is responsible for processing an ACK message and resending the packet if an ACK message is not received within an applicable TCP timeout value.

Generally, a NIC may be configured to store routing data for facilitating packet identification and flow classification, including forwarding filters and rules either locally or using MMIO address space in system or host memory. When stored locally, this routing data may be stored in either DRAM 706 or SRAM 708, such as depicted by flow tables 721 in SRAM 708. Routing/forwarding filters, rules, data, etc. stored in a MMIO address space may be written by a host to NIC 700 via Write DMA operations. Generally, setting up MMIO address space mapping may be facilitated by a NIC device driver in coordination with the operating system. The NIC device driver may also be configured to enable instructions in instruction store 710 to be updated via the operating system. Optionally, the instructions in instruction store may comprise firmware instructions that are stored in non-volatile memory, such as Flash memory, which may either be integrated on processor/controller 704 or mounted to NIC system board 702 (not shown).

CNP processing instructions 715 are configured to implement operations associated with processing CNPs described above, including implementation and updating congestion-CNP table 400. In one embodiment, congestion-CNP table 400 is implemented in SRAM 708. Optionally, congestion-CNP table 400 may be implemented in DRAM 706. FCH processing instructions 717 are configured to implement operations associated with processing packets with congestion hints described above.

In some embodiments, a dedicated processing element such as a micro-engine, core, microcontroller, etc., may be implemented for processing CNPs and FCHs during peak congestion. For example, in one embodiment arriving CNPs can be placed into a relatively small queue that is off the critical processing path, and processed by the dedicated core/processing engine to ensure timely reaction even in circumstances of congestion overwhelming the NIC.

An exemplary system architecture for a switch 800 configured to implement aspects of the embodiments relating to switch operations discussed herein is shown in FIG. 8. Switch 800 includes 16 switch ports 802 having similar configurations include a RX port 804 and a TX port 806. Each RX port 804 includes a plurality of input FIFOs 808 and a plurality of output FIFOs 810. More generally, input FIFOs 808 and output FIFOs 810 are illustrative of various types of buffers and/or queues that are implemented in switch ports or otherwise implemented in buffers and/or queues associated with RX ports and TX ports. As further shown, in the illustrated embodiment the input FIFOs and output FIFOs are configured to implement multiple virtual channels (VCs), as depicted by VC0, VC1, VC2, and VC4. The number of VCs shown if for illustrative purposes and is non-limiting. Generally, a switch may implement any number of VCs for a given port, or none at all. Moreover, different switch ports may have different configurations.

As further shown in FIG. 8, switch 800 includes one or more forwarding and routing tables 812, forwarding and QoS logic 814, CNP logic 816, adaptive routing logic 818, FCH logic 820, and a crossbar 822. Forwarding and routing tables 812 and forwarding and QoS logic 814 generally represent functionality common to many network switches, such as the core switches illustrated and described herein. CNP logic 816, adaptive routing logic 818, and FCH logic 820 are configured to implement the CNP-related operations, adaptive routing operations and FCH operations performed by a switch in accordance with the embodiments described above. Crossbar 822 is generally illustrative of any type of circuitry used to connect FIFOs, buffers, queues, etc., such as known in the art.

In addition to the components illustrated in FIG. 8, switch 800 may implement other components and functionality, such as additional buffers and/or queues for QoS and other purposes, a management interface, etc. The network switches described and illustrated herein may employ various numbers of ports, and include switch hardware configurations comprising single board switches or chassis-based switches that may include multiple switch boards or the like. It is further noted that the functionality provided by switch 800 may be implemented in a switch providing additional functionality implemented by some of today's switches, as known in the art.

For simplicity and convenience, the term "logic" is used in the text and Figures herein to more generally illustrate any means for implementing the functionality associated with a given block or components. In general, the circuitry, logic and components depicted in the figures herein may be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to Application Specific Integrated Circuits (ASICs), FPGAs, IP block libraries, or through one or more of software or firmware instructions executed on one or more processing elements including processors, processor cores, controllers, microcontrollers, microengines, etc.

The memory devices described and/or illustrated herein may be embodied as any type of memory device capable of storing data, such as any type of volatile (e.g., DRAM, etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a data center including a plurality of endpoints coupled in communication via one or more networks comprising a plurality of interconnected switches, comprising:
   at a switch,
      receiving a packet sent from a first endpoint destined for a second endpoint;
      detecting an existing congestion condition or an approaching congestion condition along a path used to forward the packet;
      generating a congestion notification packet (CNP) including a destination address for the first endpoint;
      detecting that one or more forwarding paths to the first endpoint are congested forwarding paths;
      employing an adaptive routing mechanism to select an output port on the switch such that a forwarding path other than the one or more congested forwarding paths is used to forward the CNP to the first endpoint; and
      sending the CNP outbound onto a network link coupled to the output port that is selected.

2. The method of claim 1, wherein the adaptive routing mechanism determines at least two output ports that may be used to forward the CNP to the first endpoint via respective forwarding paths that are not congested and randomly selects an output port from among the at least two output ports as the output port via which the CNP is to be forwarded.

3. The method of claim 1, wherein the adaptive routing mechanism determines at least two output ports that may be used to forward the CNP to the first endpoint via respective forwarding paths that are not congested and selects an output port from among the at least two output ports having a least amount of queued packets as the output port via which the CNP is to be forwarded.

4. The method of claim 1, wherein the CNP includes meta-data comprising at least one of congestion markings and telemetry information.

5. The method of claim 4, wherein the packet is received at an input port on the switch coupled to a first link, and wherein the CNP comprises a congestion hint packet that is forwarded to the first endpoint via a path that includes a first hop comprising the first link.

6. The method of claim 4, wherein the meta-data comprises information associated with a packet flow, a level of congestion and a timestamp.

7. The method of claim 6, wherein the switch comprises a first switch, further comprising:
at one of a second switch along a forwarding path from the first switch to the first endpoint or at the first endpoint;
receiving a first CNP for a flow having a first timestamp;
subsequentially receiving a second CNP for the flow having a second timestamp older than the first timestamp; and
discarding the second CNP.

8. The method of claim 1, further comprising:
at the first endpoint,
implementing a congestion-CNP table having a plurality of entries, each entry including information relating to a flow, a congestion level, and a timestamp;
receiving the CNP forwarded from the switch, the CNP including information identifying a flow, a congestion level, and a timestamp;
determining if the congestion-CNP table includes an entry for the flow; and
when the congestion-CNP table does not include an entry for the flow, adding a new entry to the congestion-CNP table including the flow, the congestion level, and the timestamp information included in the CNP.

9. The method of claim 8, further comprising:
at the first endpoint;
receiving a plurality of receive (RX) payload packets interspersed with CNPs; and
processing the RX payload packets using a first packet processing path including a first RX queue; and
processing the CNPs using a second processing path including a second RX queue.

10. An apparatus configured to be implemented as a first endpoint in a data center including a plurality of endpoints coupled in communication via one or more networks comprising a plurality of interconnected switches, comprising:
one or more receive (RX) ports, configured to receive packets from a network;
one or more transmit (TX) ports, configured to transmit packets outbound to a network;
memory;
one or more processing elements, coupled to the memory; and
a plurality of instructions configured to be executed on the one or more processing elements to enable the apparatus to:
implement a congestion-CNP (congestion notification packet) table having a plurality of entries, each entry including information relating to a flow, a congestion level, and a timestamp;
receive a CNP forwarded from a switch at an RX port, the CNP including information identifying a flow, a congestion level, and a timestamp;
determining if the congestion-CNP table includes an entry for the flow; and
when the congestion-CNP table does not include an entry for the flow, adding a new entry to the congestion-CNP table including the flow, the congestion level, and the timestamp information included in the CNP.

11. The apparatus of claim 10, wherein execution of the instructions further enables the apparatus to:
receive a plurality of receive (RX) payload packets interspersed with CNPs from a network at the RX port;
determine whether a packet is a CNP;
when a packet is a CNP, enqueue the packet in a first RX queue and process the packet as a CNP; otherwise
when the packet is not a CNP, enqueue the packet in a second RX queue and process the packet as an RX payload packet.

12. The apparatus of claim 10, wherein execution of the instructions further enables the apparatus to:
receive a first CNP at a first RX port associated with a flow and having a first timestamp;
subsequentially receive a second CNP at the first RX port associated with the flow and having a second timestamp older than the first timestamp; and
discard the second CNP.

13. The apparatus of claim 10, wherein execution of the instructions further enables the apparatus to:
lookup a congestion level for a flow in the congestion-CNP table; and
throttle transmission of packets associated with the flow sent outbound to a network via one of the one or more TX ports coupled to the network.

14. The apparatus of claim 10, wherein at least a portion of the entries in the congestion-CNP table include a virtual port associated with a flow.

15. A network switch, configured to be implemented in a data center network including a plurality of switches and facilitation communication between a plurality of endpoints, comprising:
a plurality of switch ports, at least of portion of which include a receive (RX) port and a transmit (TX) port;
a plurality of RX queues, to queue packets received at RX ports;
a plurality of TX queues, to queue packets to be transmitted from TX ports;
wherein the network switch is configured to,
receive a packet at an RX port sent for a first endpoint and destined for a second endpoint;
detect an existing congestion condition or an approaching congestion condition along a path through the network switch used to forward the packet;
generate a congestion notification packet (CNP) including a destination address for the first endpoint;
detect that one or more forwarding paths to the first endpoint are congested forwarding paths;
employ an adaptive routing mechanism to select a TX port such that a forwarding path other than the one or more congested forwarding paths is used to forward the CNP to the first endpoint; and
send the CNP outbound onto a network link coupled to the Tx port that is selected.

16. The network switch of claim 15, wherein the adaptive routing mechanism is configured to determine at least two TX ports that may be used to forward the CNP to the first endpoint via respective forwarding paths that are not congested and randomly select a TX port from among the at least two TX ports as the TX port via which the CNP is to be forwarded.

17. The network switch of claim 15, wherein the adaptive routing mechanism is configured to determine at least two TX ports that may be used to forward the CNP to the first endpoint via respective forwarding paths that are not congested and select an TX port from among the at least two TX ports having a least amount of packets queued in a TX queue associated with the TX port as the TX port via which the CNP is to be forwarded.

18. The network switch of claim 15, wherein the packet received at the RX port comprises a received packet, and wherein the network switch is further configured to:
- extract a source address and a destination address from the received packet;
- determine a congestion level for the path through the network switch;
- generate a CNP having a source address comprising the destination address of the received packet and a destination address comprising the source address of the packet; and
- add meta-data to the CNP including a congestion level value indicative of the congestion level that is determined and a timestamp identifying when the CNP was generated.

* * * * *